(12) United States Patent
Heath et al.

(10) Patent No.: US 10,122,413 B2
(45) Date of Patent: *Nov. 6, 2018

(54) POWER OVER DATA LINES SYSTEM USING VOLTAGE CLAMP IN PD FOR DETECTION OR CLASSIFICATION

(71) Applicant: Linear Technology Corporation, Milpitas, CA (US)

(72) Inventors: Jeffrey Heath, Santa Barbara, CA (US); David Dwelley, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/587,324

(22) Filed: May 4, 2017

(65) Prior Publication Data

US 2017/0237575 A1   Aug. 17, 2017

Related U.S. Application Data

(62) Division of application No. 14/552,164, filed on Nov. 24, 2014, now Pat. No. 9,859,951.

(Continued)

(51) Int. Cl.
*H04B 3/56* (2006.01)
*H02J 3/12* (2006.01)
(Continued)

(52) U.S. Cl.
CPC ............... *H04B 3/56* (2013.01); *H02J 3/12* (2013.01); *H04L 12/10* (2013.01); *H04L 12/40045* (2013.01)

(58) Field of Classification Search
CPC .................................. H04L 12/10; H04B 3/56
See application file for complete search history.

(56) References Cited

U.S. PATENT DOCUMENTS

2006/0077888 A1 * 4/2006 Karam ................. H04L 1/22
                                                        370/216
2006/0092000 A1   5/2006 Karam et al.
(Continued)

FOREIGN PATENT DOCUMENTS

JP    2008-529352 A    7/2008
JP    2008-529353 A    7/2008
(Continued)

OTHER PUBLICATIONS

EP App No. 15003333.0, "Extended EP Search Report," dated Feb. 15, 2016, 8 pages.

*Primary Examiner* — Jared Fureman
*Assistant Examiner* — James Evans
(74) *Attorney, Agent, or Firm* — Patent Law Group LLP; Brian D. Ogonowsky

(57) ABSTRACT

A PoDL system includes a PSE connected via a wire pair to a PD, where differential data and DC power are transmitted over the same wire pair. Typically, low voltage/current detection and classification routines are required upon every powering up of the system to allow the PD to convey its PoDL requirements to the PSE. Various techniques are described that simplify or obviate such start-up routines or enable increased flexibility for the PoDL system. Such techniques include: ways to specify a particular PD operating voltage; ways to disable the PD's UVLO circuit during such routines; using opposite polarity voltages for the two routines; using voltage limiters or surge protectors to convey the PoDL information; detecting loop resistance; using a PSE memory to store previous results of the routines; and powering the PD communication circuit using the wire pair while the PD load is powered by an alternate power source.

13 Claims, 9 Drawing Sheets

Related U.S. Application Data

(60) Provisional application No. 61/909,232, filed on Nov. 26, 2013.

(51) Int. Cl.
*H04L 12/40* (2006.01)
*H04L 12/10* (2006.01)

(56) References Cited

U.S. PATENT DOCUMENTS

| | | | | |
|---|---|---|---|---|
| 2006/0103996 | A1* | 5/2006 | Carroll | G06F 1/3203 361/90 |
| 2006/0168458 | A1* | 7/2006 | Stineman, Jr. | H04L 12/10 713/300 |
| 2006/0271992 | A1 | 11/2006 | Bower et al. | |
| 2006/0291405 | A1* | 12/2006 | Karam | H04L 12/10 370/284 |
| 2008/0062586 | A1* | 3/2008 | Apfel | H04L 12/10 361/18 |
| 2008/0164884 | A1* | 7/2008 | Hussain | H04L 12/10 324/522 |
| 2009/0189646 | A1* | 7/2009 | Cagno | G06F 13/4081 327/77 |
| 2010/0117808 | A1* | 5/2010 | Karam | H04L 12/10 713/300 |
| 2011/0046494 | A1* | 2/2011 | Balji | A61B 5/022 600/499 |
| 2011/0258464 | A1* | 10/2011 | Gammel | G06F 1/266 713/300 |
| 2013/0049469 | A1* | 2/2013 | Huff | G06F 1/266 307/62 |
| 2013/0187632 | A1 | 7/2013 | Ohana | |
| 2013/0257161 | A1* | 10/2013 | Ferentz | H02J 4/00 307/80 |
| 2014/0129850 | A1* | 5/2014 | Paul | H04L 12/10 713/300 |
| 2014/0361693 | A1* | 12/2014 | Angelin | H05B 33/0842 315/152 |

FOREIGN PATENT DOCUMENTS

| | | |
|---|---|---|
| WO | 2006081112 A1 | 8/2006 |
| WO | 2006099440 A1 | 9/2006 |

* cited by examiner

FIG. 4B
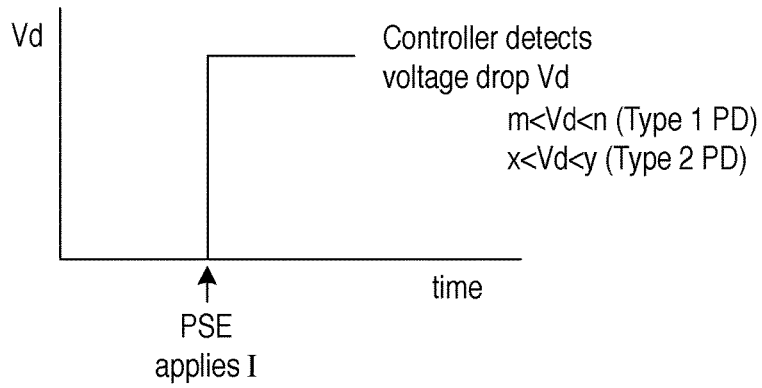
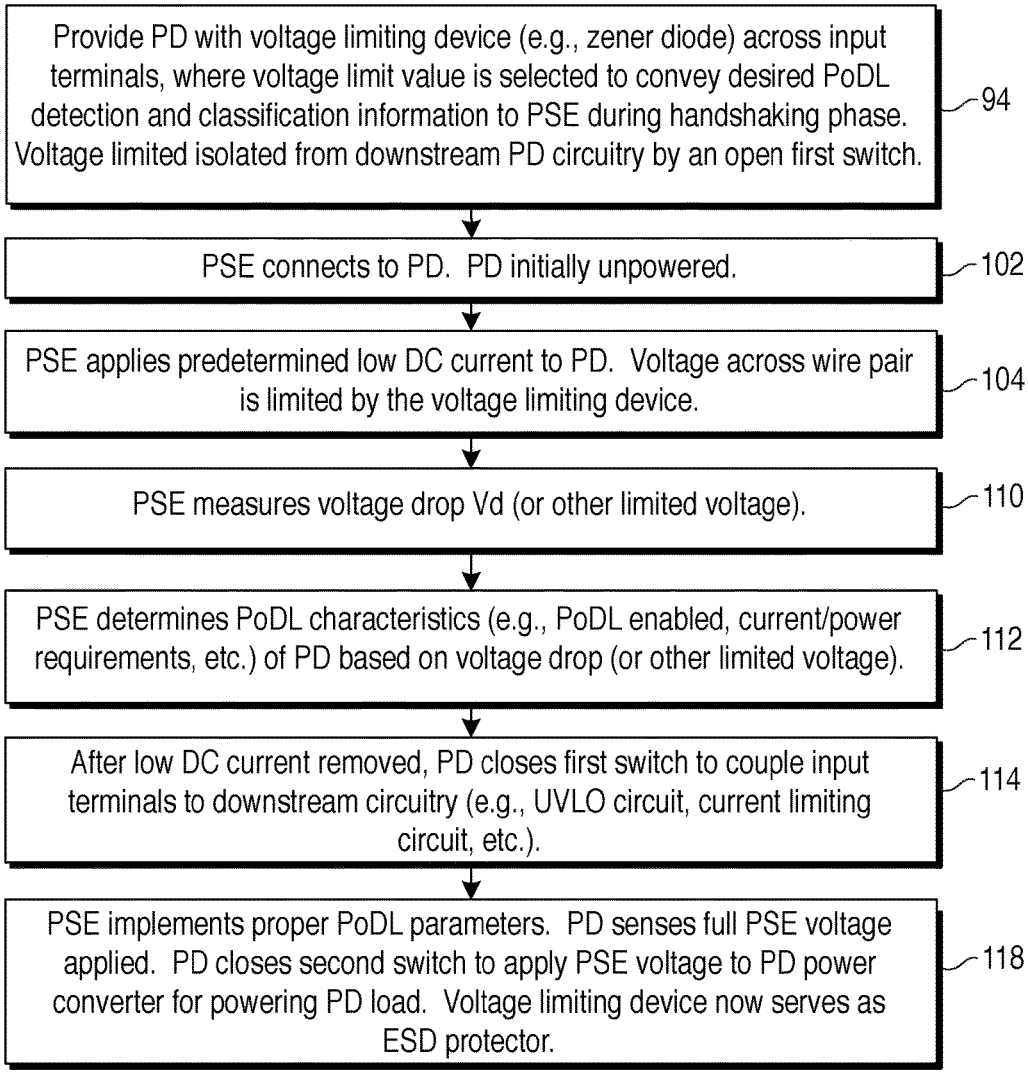
FIG. 4C

POWER OVER DATA LINES SYSTEM USING VOLTAGE CLAMP IN PD FOR DETECTION OR CLASSIFICATION

CROSS-REFERENCE TO RELATED APPLICATIONS

This application is a division of U.S. application Ser. No. 14/552,164, filed Nov. 24, 2014, by Jeffrey Heath et al., which claims priority from U.S. Provisional Application Ser. No. 61/909,232, filed Nov. 26, 2013, by Jeffrey Heath et al., both incorporated herein by reference.

FIELD OF THE INVENTION

This invention relates to Power Over Data Lines (PoDL) systems, where power from a Power Sourcing Equipment (PSE) is transmitted to a Powered Device (PD) over a single wire pair that also used for conducting differential data signals, typically Ethernet signals, and where a handshaking routine is carried out before the full PoDL voltage is applied to the wire pair. The invention is more particularly directed to the PD conveying a detection signature or a classification signature using a voltage clamp.

BACKGROUND

It is known to transmit power over data lines to power remote equipment. Power Over Ethernet (PoE) is an example of one such system. In PoE, limited power is transmitted to Ethernet-connected equipment (e.g., VoIP telephones, WLAN transmitters, security cameras, etc.) from an Ethernet switch. DC power from the switch is transmitted over two twisted wire pairs in the standard CAT-5 cabling. One or both of the wire pairs also transmit differential data signals, since the DC common mode voltage does not affect the data. In this way, the need for providing any external power source for the Powered Devices (PDs) can be eliminated. The standards for PoE are set out in IEEE 802.3, incorporated herein by reference. In PoE, the Power Sourcing Equipment (PSE) supplies the same standardized voltage to every type of PD sufficient to ensure that the PD receives at least 37V, despite unknown voltage drops along the wire pairs.

A newer technology is Power Over Data Lines (PoDL) where power is transmitted over a single, twisted wire pair along with the differential data. As of the date of this disclosure, the IEEE is in the process of receiving comments to develop standards for PoDL as IEEE P802.3bu. PoDL may be more flexible than PoE and, since it requires one less wire pair, is likely to become a popular technique, especially in automobiles.

It is envisioned that most future applications of PoDL will require some sort of handshaking between the PSE and the PD before the full power/voltage is applied to the data lines by the PSE. This is because different types of PDs may need different voltage levels, different maximum power levels, or not be PoDL-compatible. Other information may also be conveyed during the handshaking.

Such handshaking may consist of a low power/voltage signal being generated by the PSE on the wire pair, and the PD may respond in a characteristic way to identify to the PSE that the PD is PoDL-compatible (typically called a detection signature) as well as to identify voltage and power requirements (typically called a classification signature), among other information.

In an automobile application for PoDL, for instance, the types of PSEs and PDs may be highly regulated by the automobile manufacturer. This allows various innovative and customized techniques to be used for the detection and classification schemes.

Thus, what is needed are various possible detection and classification schemes for PoDL that can be applied for different applications.

SUMMARY

Various detection and classification techniques for PoDL systems are disclosed herein. The best choice will depend on the particular application.

Examples of the techniques described include:

Techniques to convey that the PD is PoDL enabled.

Techniques to convey a voltage signature from the PD to the PSE that identifies a voltage level to be supplied to the PD.

Techniques to allow the PSE to supply a wide range of voltages to different types of PDs.

Techniques to convey a maximum power signature from the PD to the PSE.

Techniques to prevent the Undervoltage Lockout (UVLO) circuit in the PD from coupling the incoming voltage on the data wires to the PD load in the event the detection/classification test voltages exceed the UVLO threshold voltage.

Techniques to allow the detection voltage polarity to be opposite to the classification voltage polarity to isolate the two schemes and avoid interference from other circuits.

Techniques to generate the detection or classification signature of a PD based on a clamped voltage (low impedance above a voltage threshold), created by a clamp circuit in the PD, where the clamp may double as an ESD protection circuit.

Techniques to generate the detection or classification signature of a PD based on a threshold voltage of a surge stopper (high impedance above a voltage threshold) in the PD, where the surge stopper may double as an ESD protection circuit.

Techniques to automatically identify the loop resistance between the PSE and the PD so the PSE can adjust its output voltage to deliver a regulated voltage to the PD.

Techniques to detect whether the PD is still coupled to the PSE, even when the PD is not drawing power, or to detect whether the PD has been disconnected and replaced.

Techniques to store detection and classification information in a memory at the PSE so the handshaking does not need to be performed each time upon powering up.

Techniques to allow the main PD load to be powered by an alternate power source on the PD side, while also allowing the PSE to supply power to the front end (the "physical layer") of the PD via the data wires to enable the PD to communicate while the alternate power source is disabled.

Various other embodiments are described.

The terms PSE and PD are used throughout this disclosure to identify equipment that supplies power and equipment that receives the power, and such equipment/devices are not limited to Ethernet equipment/devices unless specified.

BRIEF DESCRIPTION OF THE DRAWINGS

FIG. 4B illustrates the voltage drop created by the clamp circuit of FIG. 4A.

FIG. 4C is a flowchart describing the operation of FIG. 4A when detecting PoDL information using the clamp circuit.

FIG. 5A also shows resistors to convey other PoDL information after the surge stopper has been triggered.

FIG. 6A also illustrates a "maintain power signature" resistor in the PD that conveys whether the PSE is still connected to the PSE.

Elements that are the same or equivalent are labeled with the same numeral.

DETAILED DESCRIPTION

The various circuits shown represent the pertinent aspects of a PoDL system, such as where a single twisted wire pair carries Ethernet data as well as detection/classification information and power. The portions of the PoDL system relating to the differential data paths are independent of the invention and may be conventional. Therefore, the data paths are not described.

In future PoDL systems, unlike the standardized PoE systems, different PDs may have different input voltage requirements. For example, one type of PD may require a regulated 5V input over the wire pair, obviating the need for a PD voltage regulator, while another PD may require at least 24V and include a voltage regulator for powering the PD load. Therefore, if a PSE must be able to support the various types of PD that may be connected to it via the wire pair, the PSE must know the "voltage classification" of the PD and must be able to generate a variable voltage to supply the required voltage over the wire pair.

Assuming the PSE must be able to supply voltages as low as 5V to some types of PDs and supply much higher voltages to other types of PDs, and the type of PD connected is initially unknown to the PSE, the detection/classification test must use low voltages to ensure there will be no damage to the PD.

Figure 1:
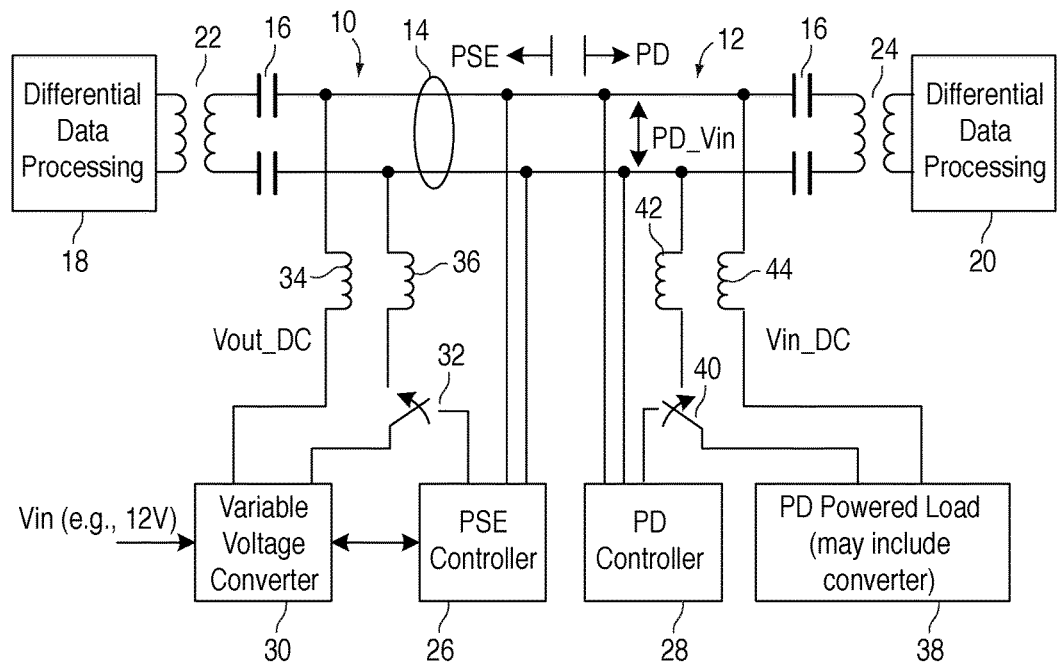
FIG. 1 illustrates a PoDL system that enables Ethernet communication and power transmission over a single pair of wires, where the PSE can supply a variable voltage to the PD, depending on the detected voltage requirements of the PD.

FIG. 1 illustrates pertinent functional units in a PoDL system in accordance with one embodiment of the invention. The PSE 10 and PD 12 are shown coupled via a single data wire pair 14 of any length. The wire pair 14 may conduct Ethernet differential data signals that are filtered by capacitors 16, where the wire pair 14 is further DC-isolated from the respective differential data processing circuits 18 and 20 by transformers 22 and 24. The Ethernet data portion of the circuit may be conventional and not relevant to the present invention. Any DC power supplied by the PSE 10 to the PD 12 is blocked from the differential data processing circuits 18 and 20 by action of the capacitors 16 and transformers 22 and 24.

A PSE controller 26 receives both AC and DC signals on the wire pair 14 and can transmit both AC and DC signals to the PD controller 28 via the wire pair 14. The PSE controller 26 may be an IC that performs various routines under the control of either a processor or firmware. The PSE controller 26 performs a handshaking routine with the PD controller 28 to detect that the PD 12 is PoDL-enabled and to obtain further information (e.g., a classification signature) from the PD 12 conveying the PoDL requirements of the PD 12. The PD controller 28 may be an IC that performs the various routines under the control of either a processor or firmware.

The PD controller 28 carries out the handshaking routine in response to signals by the PSE controller 26 to convey its required PoDL information in order for the PSE 10 to supply the proper voltage and power to the PD 12 up to a maximum power level (defined in the classification signature).

Upon powering up of the system, the PSE controller 26 provides a limited current or voltage (e.g., 5V) on the wire pair 14 to test for a signature response from the PD 12 that identifies that the PD 12 is PoDL-enabled. Various detection signature techniques can be used. In one embodiment, a certain value resistor, such as 25K ohms, is across the wire pair 14 in the PD 12, and this signature resistance value is detected by the PSE controller 26 by detecting a resulting voltage or current. In another embodiment, a capacitor, zener diode, or other circuit element is connected to the wire pair 14 in the PD 12, and the slope of the resulting voltage (if a capacitor is used) or the magnitude of the limited voltage (if a zener diode is used) conveys if the PD is PoDL-enabled. If such a signature signal is not detected, the PSE controller 26 does not continue on with the handshaking process and does not provide power over the wire pair 14.

If the detection signature is identified by the PSE controller 26, additional low current or voltage signals are generated by the PSE controller 26 during the classification phase to identify details regarding the PoDL requirements of the PD 12. Various classification techniques are later described with reference to the figures.

Since the PSE 10 may be coupled to a variety of PD's, and the different PD's may require different operating voltages from the PSE 10, the PD 12 must convey its operating voltage requirement, such as 5V, 12V, 44V, etc.

Once the classification phase is complete, the PSE controller 26 controls a variable voltage converter 30, which may receive an unregulated input voltage of, for example 12V in an automobile application, and outputs a regulated voltage Vout_DC dictated by the classification signature from the PD 12. The PSE controller 26 then controls a switch 32 (e.g., a MOSFET) that couples the converter 30 output to the wire pair 14 via filtering inductors 34 and 36. The variable voltage converter 30 may be a plurality of difference voltage sources that can output different voltages when enabled, or the converter 30 can be a single converter whose feedback voltage or reference voltage is varied to output a selected regulated voltage. For example, a resistor divider network connected between the output voltage terminal and an error amplifier feedback terminal may be adjusted by a control signal to cause a switching voltage converter to output a different regulated voltage. Such variable feedback techniques and switching regulators are well-known.

The PD controller 28 includes an Undervoltage Lockout (UVLO) circuit (not shown in FIG. 1) that only couples the voltage on the wire pair 14 to the PD load 38 when the voltage exceeds a threshold level, such as 5V. Once this level is detected, the PD controller 28 closes a switch 40 (e.g., a MOSFET) to couple the incoming PoDL voltage Vin_DC to the PD load 38 via the filtering inductors 42 and 44. The DC voltage is blocked from the data path by the filtering capacitors 16. The PD load 38 may or may not include a voltage converter for converting the voltage on the wire pair 14 to a regulated voltage required by the main PD load.

The front end of the PD 12 may include a diode bridge to ensure the correct polarity voltage is provided to the PD 12.

One issue with the above-described system is that the PD load 38 may require an operating voltage of 5V from the PSE 10, but the detection and classification schemes may use voltages that exceed 5V. The PSE 10 must generate detection and classification signals that are sufficiently high so that voltage drops along the wire pair 14 do not reduce the detection/classification signature signals below a threshold level for detection by the PSE 10. However, we do not want the UVLO circuit in the PD 12 to trigger during the detection or classification phases.

Figure 2A:
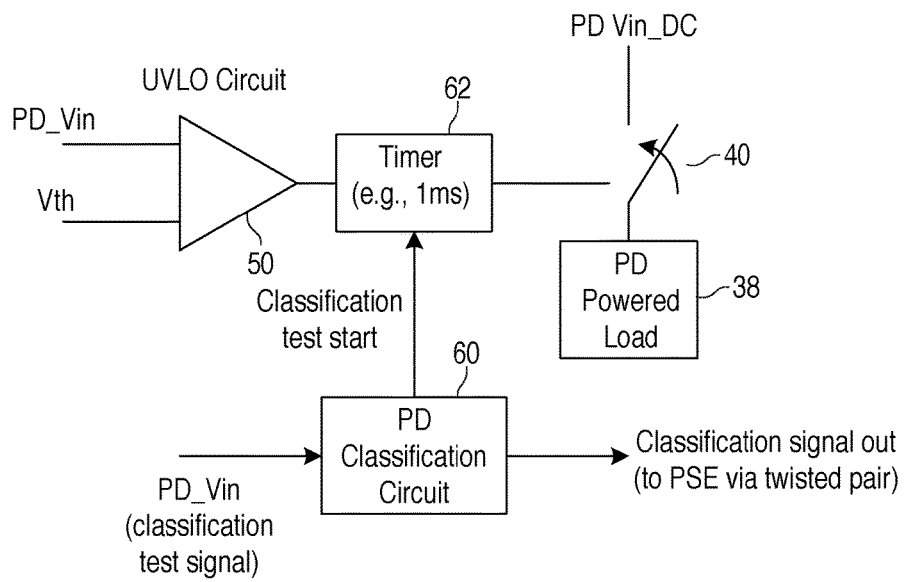
FIG. 2A illustrates disabling the UVLO circuit in the PD for a time sufficient to perform handshaking in the event that the handshaking voltages exceed the UVLO threshold.
Figure 2B:
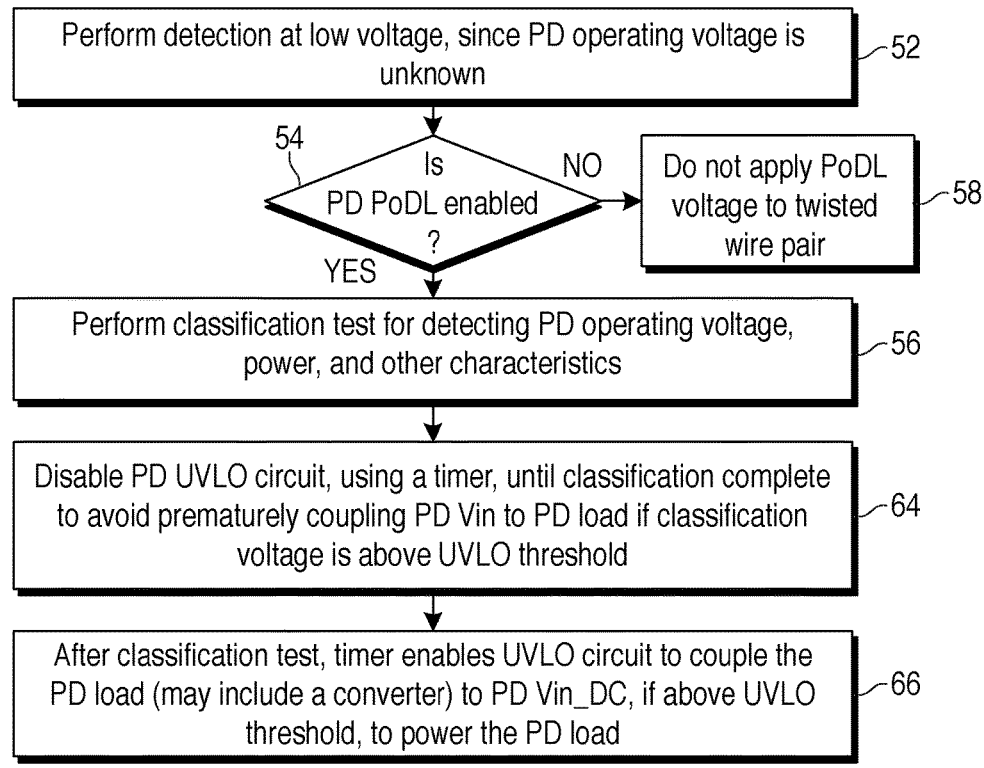
FIG. 2B is a flowchart describing the operation of FIG. 2A.

FIG. 2A illustrates a timer circuit that may be used to disable the PD's UVLO during the detection and/or classification phases. FIG. 2B is a flowchart showing the steps performed by the circuit of FIG. 2A. In the description below, it is assumed that the detection signal provided by the PSE 10 is always below any UVLO threshold voltage, but the classification may be above the UVLO threshold voltage. However, the same circuit may be used to disable the UVLO circuit during the detection phase. The UVLO circuit, PD classification circuit, and timer may be in the PD controller 28 IC.

A UVLO circuit, using a comparator 50, compares the voltage PD_Vin across the wire pair 14 with a threshold voltage Vth to determine when the switch 40 is to be closed in order for the PoDL voltage to be applied to the PD load 38. Let's assume Vth is 5V.

In step 52 of FIG. 2B, the detection phase is performed at a low voltage. If the detection signature from the PD 12 (such as resistance value) indicates the PD 12 is PoDL-enabled (step 54), the process proceeds to the classification phase (step 56). If no detection signature is detected, the PoDL handshaking process ends (step 58)

A PD classification circuit 60 (FIG. 2A) in the PD controller 28 (FIG. 1) detects a classification signal from the PSE 10, and starts the timer 62. All processes may be under the control of firmware or a programmed processor in the PD controller 28. The PD controller 28 assumes any voltages within a certain period after the detection phase is a classification phase. Assuming that the detection or classification signal may exceed 5V (i.e., Vth), the timer 62 blocks the signal from the UVLO comparator 50 during the time-out period, such as 1 ms (step 64). The PD classification circuit 60 then presents the appropriate classification signature on the wire pair 14 for analysis by the PSE 10. The classification phase is then terminated by the PSE 10. Soon after, the timer 62 times out and couples the output of the UVLO comparator 50 to the switch 40 (step 66). When the PSE 10 then supplies the PoDL operating voltage to the PD 12 that is greater than Vth, the switch 40 is closed by the UVLO circuit, and power is supplied to the PD load 38 via the wire pair 14 (step 66).

Figure 3A:
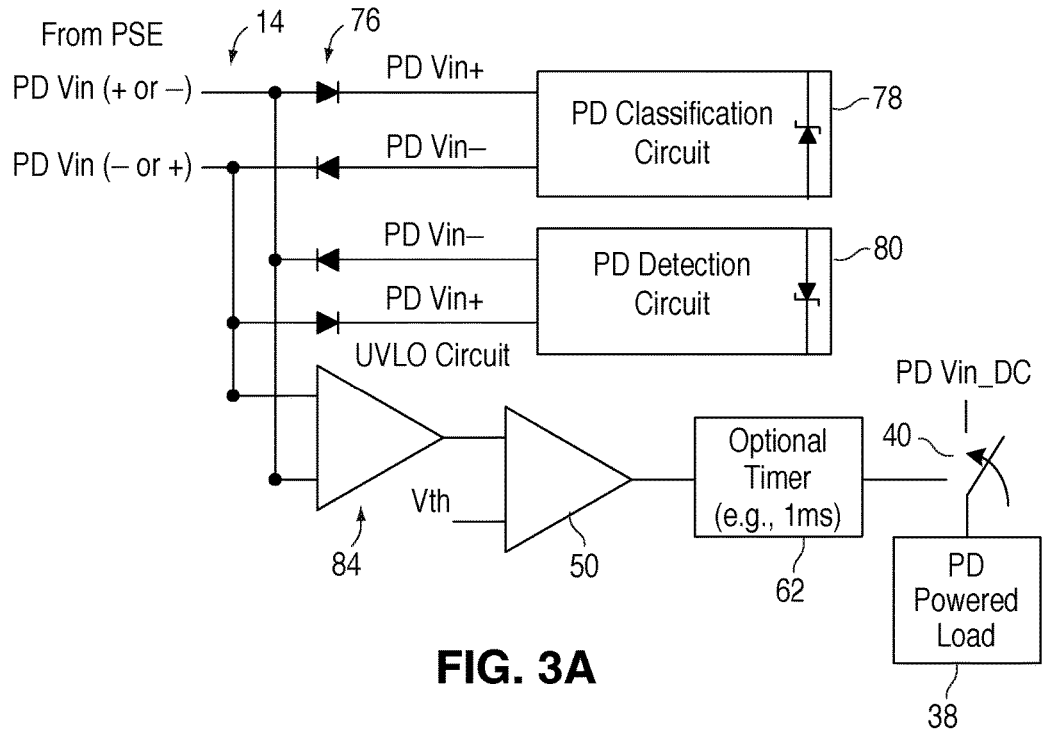
FIG. 3A illustrates performing the detection and classification schemes using opposite voltage polarities to effectively isolate the detection and classification circuits.
Figure 3B:
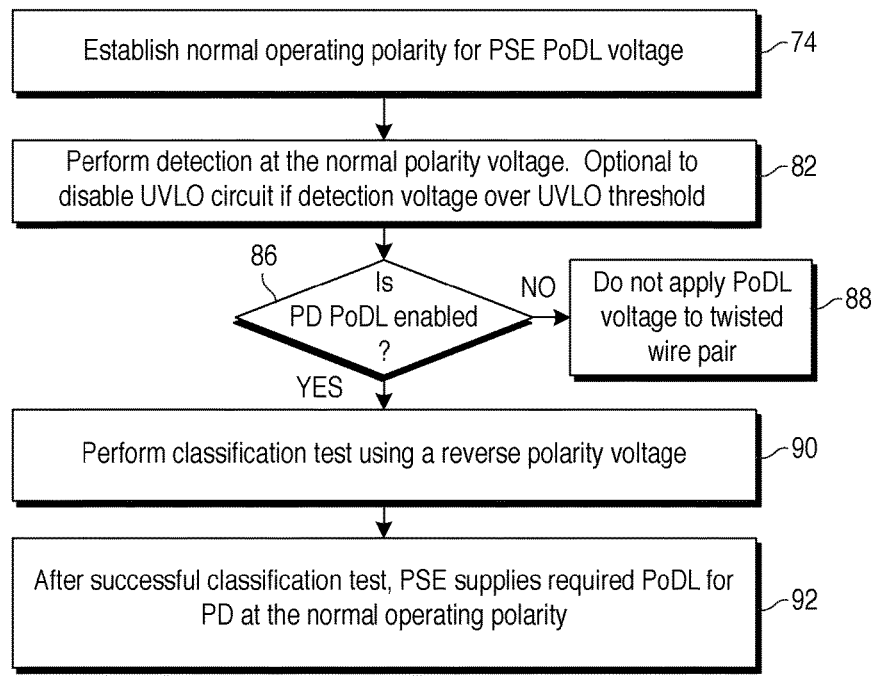
FIG. 3B is a flowchart describing the operation of FIG. 3A.

FIGS. 3A and 3B are directed to a technique that allows the detection and classification circuits to be effective isolated from one another during the handshaking phase so there is no interference by the circuits. In this way, the detection and classifications circuits may be similar, such as by using resistors, capacitors, or zener diodes to convey signature information. Further, the technique may obviate the need for the timer in FIG. 2A when the PD operating voltage is similar to the handshaking voltages. This is accomplished by the PSE 10 using one voltage polarity for the detection phase and the opposite polarity for the classification phase. If the polarity for the classification phase is opposite that for the operating voltage, the UVLO circuit in the PD will not detect the classification voltages being above the threshold level for triggering the UVLO circuit.

In step 74 of FIG. 3B, the system designer decides on the normal operating voltage polarity for the PSE PoDL. In FIG. 3A, diodes 76 are configured so that only signals with the proper voltage polarity will be coupled to the PD classification circuit 78 and PD detection circuit 80. The circuits 78 and 80 may present signature resistance values, zener diode threshold values, capacitor values, or perform other functions on the PSE signals to convey the desired PoDL information to the PSE 10. We will assume the normal voltage polarity for the PoDL is the same polarity used for the detection phase at a low voltage/current.

In step 82, the detection is performed at the normal polarity, and the diodes 76 coupling the detection circuit 80 to the wire pair 14 are forward biased. If the detection signals are above the UVLO threshold voltage of the UVLO circuit 84, the timer 62 may be used to prevent the UVLO circuit 84 from closing the switch 40, as previously described.

In step 86, it is determined whether the PD is PoDL-enabled. If not, the PoDL handshaking routine is terminated (step 88).

If the PD is PoDL-enabled, the classification phase is carried out using an opposite polarity voltage (step 90), where the diodes 76 coupling the PD classification circuit 78 to the wire pair 14 are forward biased. The UVLO circuit 84 will not be triggered by the reverse polarity voltages, and the detection circuit 80 is isolated from the wire pair 14.

After the handshaking phase, the PSE supplies the designated PoDL voltage on the wire pair 14 to the PD load 38 at the normal voltage polarity (step 92). Therefore, the classification circuit 78 is decoupled from the wire pair 14. The detection circuit resistor or other signature generator may be decoupled from the wire pair 14 by a switch internal to the detection circuit, or the signature circuit may be trivial to the operation of the PD during normal operation.

Figure 4A:
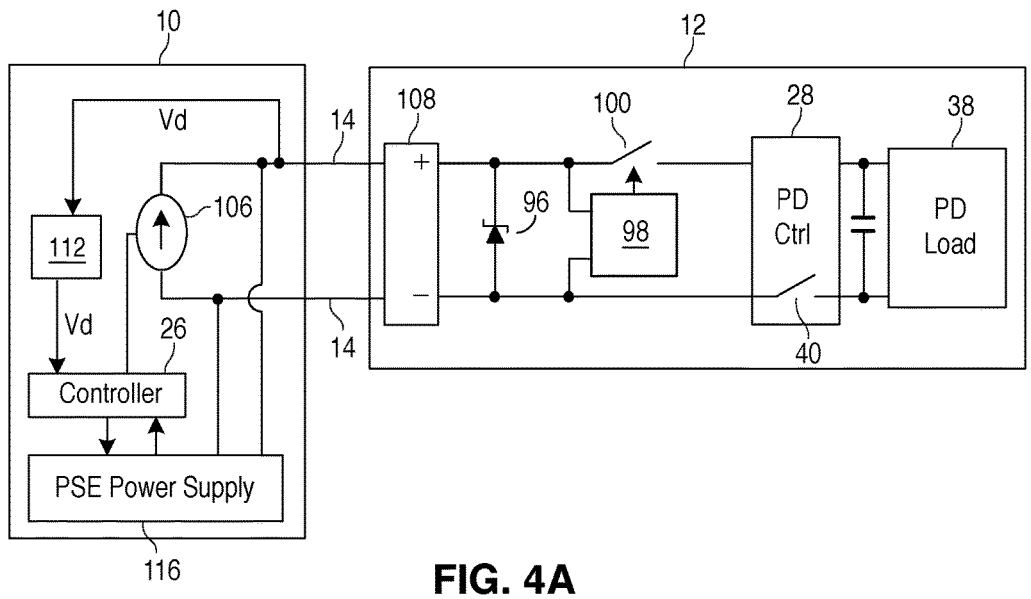
FIG. 4A illustrates a circuit where PoDL information about the PD is conveyed by the clamp voltage magnitude of a zener diode or other clamp circuit in the PD.

FIGS. 4A-4C are directed to using a voltage limiting device in the PD to convey the detection and/or classification signatures. In one example, the detection and classification signals generated by the PSE controller 26 may have a 10V limit. Separate detection and classification devices may be used, and the invention of FIGS. 4A-4C may be combined with the inventions of the previous figures. The voltage limiting device may create a limited voltage of, for example, 7V to both convey that the PD is PoDL-enabled and that the required operating voltage is 5V (step 94). Additional information may be conveyed by the magnitude of the limited voltage, such as the maximum power level, which may be used by the PSE for budgeting purposes and for detecting overloads.

In the example of FIG. 4A, the voltage limiting device is a zener diode 96 having a threshold higher than the normal PoDL operating voltage of the PD. A detector circuit 98 isolates the PD controller 28 from the zener diode 96, via a switch 100, during the detection phase so the detection signature will not be affected by other circuitry in the PD (step 94).

In step 102, the PSE 10 is powered up or the PD 12 is connected to the PSE 10.

In step 104, the PSE 10 turns on a low current source 106, which applies a low current to the zener diode 96. A diode bridge 108 may be used to ensure the proper polarity is applied to the zener diode 96. FIG. 4B illustrates that the zener diode 96 limits the resulting voltage.

In step 110, a voltage detector 112, detects the resulting voltage limited by the zener diode 96, and the resulting voltage drop Vd is applied to the PSE controller 26 for identifying the PoDL characteristics that corresponds to the particular Vd level (step 112). For example, the Vd level may be digitized and a look up table may be addressed that provides the PoDL characteristics to the PSE, such as the operating voltage and maximum power level. Each set of PoDL characteristics may be associated with a narrow range of Vd levels since there may be an unknown voltage drop along with wires due to resistance. FIG. 4B illustrates that two ranges of Vd levels are associated with Type I and Type II PDs, relating to a maximum power.

After the handshaking phase, when the current source 106 is disabled, the switch 100 is closed (step 114), and the PSE power supply 116 is controlled by the PSE controller 26 to provide the proper voltage to the wire pair 14.

In step 118, after the UVLO circuit in the PD controller 28 detects the proper operating voltage, the UVLO circuit closes the switch 40 to power the PD load 38. The zener diode 96 now operates as an ESD protection device since its threshold is above the operating PoDL voltage.

In some applications, the PD includes a voltage regulator since the voltage on the wire pair 14 is affected by voltage drops in the wire loop. If the resistance of the loop were known, the voltage drop along the loop can be calculated for any current level, and the voltage supplied by the PSE could be regulated by the PSE to supply a precisely known voltage to the PD. This may obviate the need for any voltage regulator in the PD, or allow the use of a simple linear regulator in the PD rather than a switching regulator.

Figure 4D:
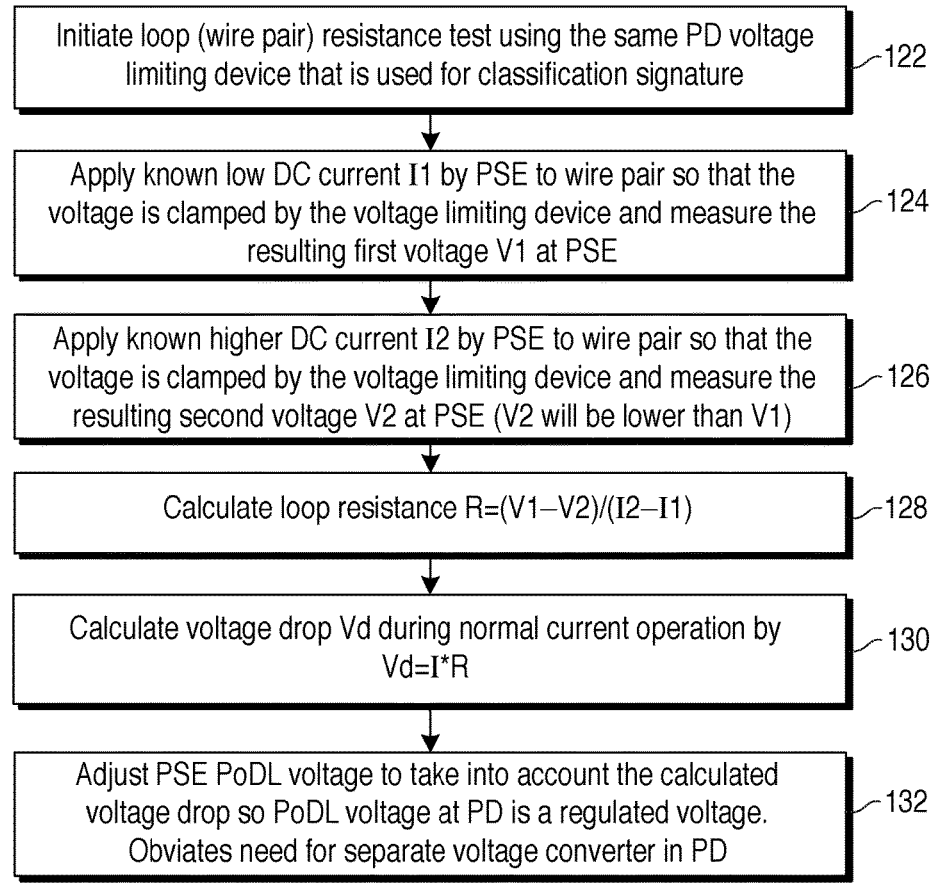
FIG. 4D is a flowchart describing the operation of FIG. 4A when using the clamp circuit in FIG. 4A to determine the loop resistance between the PSE and the PD, such as for adjusting the output voltage of the PSE.

FIG. 4D describes steps that may be used, in conjunction with the zener diode 96 (or other voltage limiting device), to calculate the loop resistance and the expected voltage drop along the loop. All processing may be performed by the PSE controller 26 in FIG. 4A.

In step 122 of FIG. 4D, the loop resistance test is initiated after the PSE detected the zener diode 96 (or other voltage limiting device) during the detection phase.

In step 124, the current source 106 (FIG. 4A) applies a known low DC current I1 to the wire pair 14, and the resulting measured voltage at the PSE is due to the clamping of the voltage by the zener diode 96 and the voltage drop (I1×R) due to the loop resistance. This resulting voltage is V1 and is stored in a memory in the PSE.

In step 126, a known higher current I2 is supplied by the current source 106, and the resulting voltage V2 across the wire pair 14 is again measured and stored in the memory. Since I2 is greater than I1, there will be a greater loop voltage drop, but the contribution from the zener diode will be the same. The current source 106 may comprise a plurality of current sources or a single current source where a parameter is adjusted to generate multiple current levels.

In step 128, the loop resistance R is calculated as $R=(V1-V2)/(I2-I1)$.

In step 130, during normal operation, the voltage drop Vd due to the loop resistance is calculated as $Vd=I*R$, where I is the operating current. Since the current may change during operation, the Vd will change.

In step 132, the PSE PoDL voltage is dynamically adjusted, based on the PD current, to take into account the voltage drop along the wire pair 14 so the voltage at the PD may be regulated to a precise voltage. This obviates the need for a separate voltage regulator at the PD, or allows the use of an efficient linear regulator at the PD. The variable voltage source at the PSE may be the variable voltage converter 30 in FIG. 1.

Figure 5A:
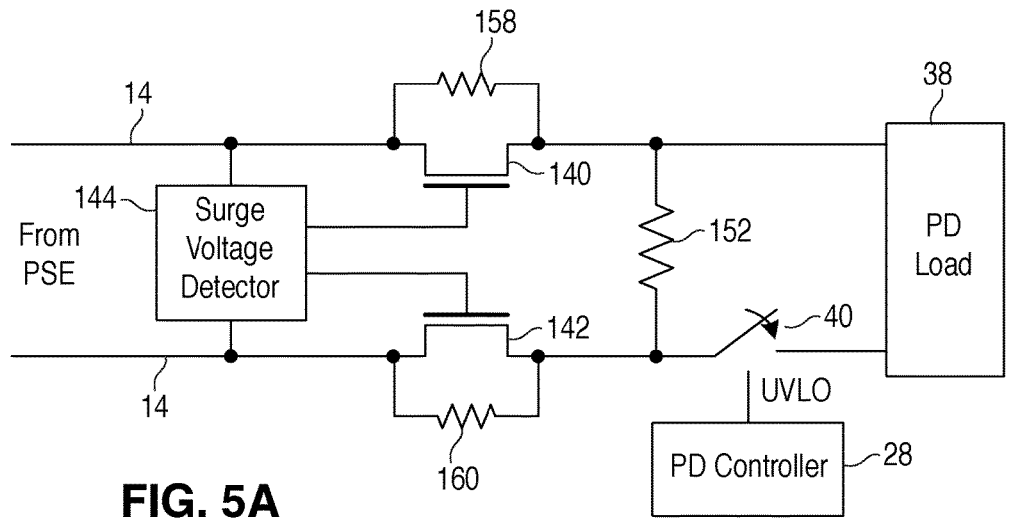
FIG. 5A illustrates the use of a surge stopper in the PD to convey PoDL information about the PD as well as to protect the PD from voltage surges.
Figure 5B:
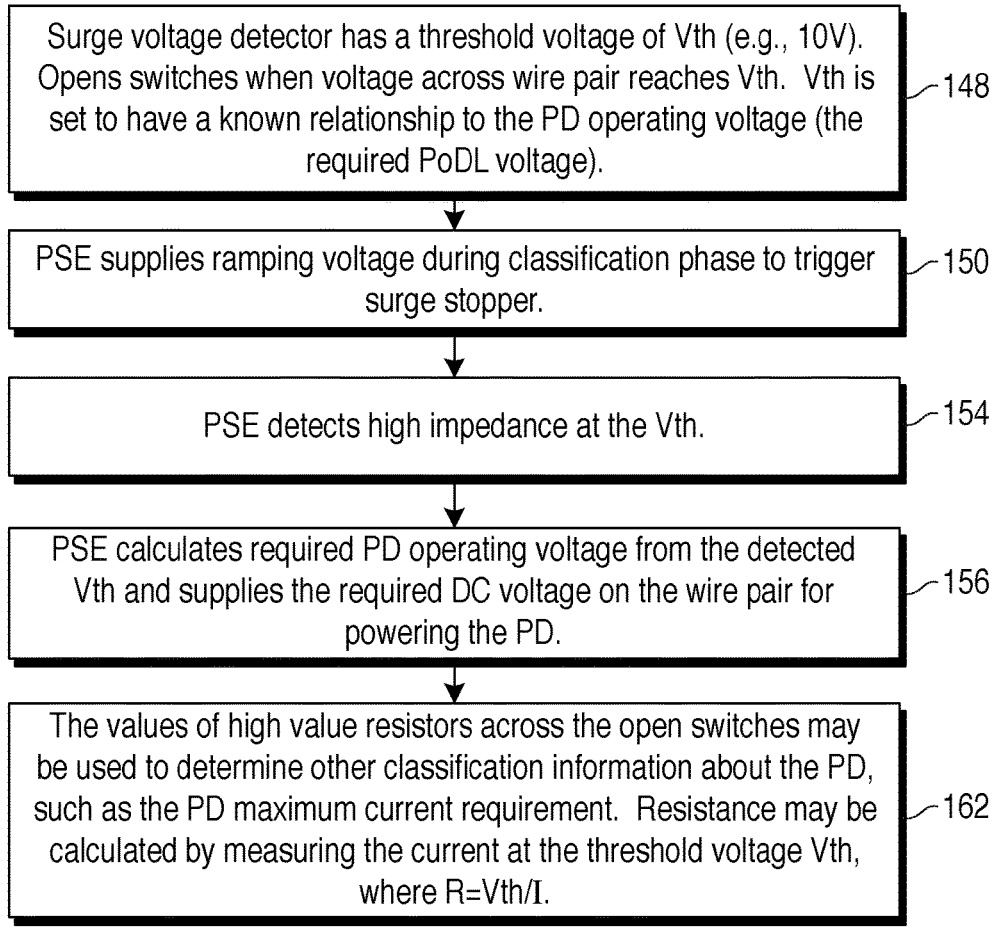
FIG. 5B is a flowchart describing the operation of FIG. 5A.
Figure 5C:
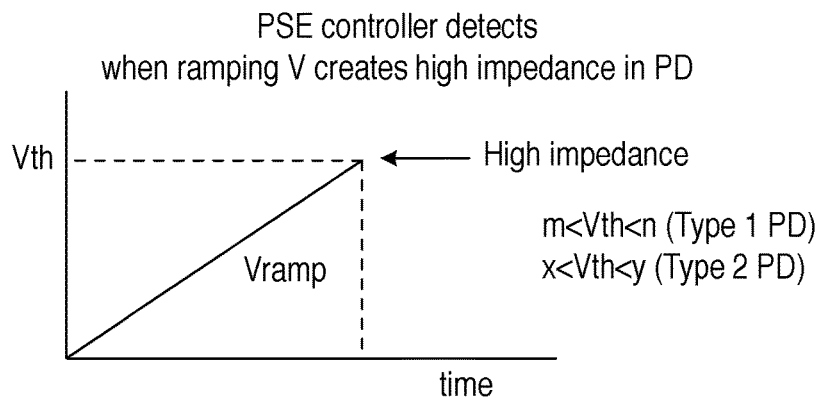
FIG. 5C illustrates how the surge stopper of FIG. 5A becomes a high impedance when the input voltage reaches a threshold level.

FIGS. 5A-5C are directed to conveying PoDL characteristics by the PD using a surge stopper in the PD, where the magnitude of the threshold voltage of the surge stopper corresponds to the PoDL characteristics. During normal operation, the surge stopper may perform the function of blocking voltage surges to prevent damage the PD circuitry. In the various embodiments, the threshold voltages corresponding to a particular set of PoDL characteristics are within various ranges of threshold voltages, since there may be small, variable voltage drops along the wire pair 14 at the low detection and classification currents.

FIG. 5A shows a simple surge stopper for each wire, formed by the MOSFETs 140 and 142 in series with the associated wire. A surge voltage detector 144 (a comparator and driver) detects when the voltage across the wire pair 14 exceeds a certain threshold voltage Vth, such as 10V. The threshold will be higher than the operating voltage of the PD. The threshold voltage level is easily set, such as by selecting a resistor divider in series with a current source to create a threshold voltage, and then comparing the threshold voltage to the actual voltage across the wire pair 14. When the threshold is exceeded, the detector 144 applies a suitable voltage to the gates of the MOSFETs 140 and 142 to create a high impedance (step 148 in FIG. 5B).

In step 150, initially, the PSE supplies a ramping voltage to the PD during the classification phase until the surge stopper is triggered. FIG. 5C illustrates the high impedance that occurs at the threshold voltage Vt. Prior to the surge stopper triggering, the PSE will detect an impedance that is much lower than an open circuit. A high value resistor 152 across the wire pair in the PD ensures that there is a circuit formed by the PD even when the UVLO circuit keeps the switch 40 open. The timer circuit of FIG. 2A, or the voltage polarity inversion technique of FIG. 3A, may be used to prevent the UVLO circuit from closing the switch 40 prior to the receiving the normal PoDL operating voltage.

In step 154, the PSE detects that the surge stopper has been triggered by detecting the change in impedance. The level of the ramping voltage is also detected, and the particular level is used to cross-reference the PD's PoDL characteristics from a look up table in the PSE, or an algorithm is performed on the level to determine the PoDL characteristics (step 156). The PSE then supplies the required voltage to the PD specified by the surge stopper threshold level (step 156). Since the operating voltage to the PD is below the surge stopper threshold, the MOSFETs 140 and 142 are normally closed, and the UVLO switch 40 is also closed. Since the precise threshold voltage of the surge stopper may not be known by the PSE due to a voltage drop along the wire pair 14, a variety of possible ranges of the detected threshold voltage are used to classify the PD, such as a Type I or Type II PD, as shown in FIG. 5C, where the different types relate to the maximum power level.

When the MOSFETs 140 and 142 are opened during the classification test, high value resistors 158 and 160 are in series with the loop. In step 162, the values of these resistors 158/160 are detected, where the particular values correspond to the PODL characteristics of the PD, such as the operating voltage and maximum current/power for the PD. Therefore, by using the resistors 158 and 160, the resistance values and not the surge stopper threshold voltage may be used to convey the PoDL characteristics. An advantage of this technique is that the resistors 158/160 have no effect on the circuit when the MOSFETs 140/142 are closed during normal operation, and the surge stopper threshold may be optimized for the particular application. The resistance values may be detected by measuring the resulting current at the threshold voltage where R=Vth/I.

Figure 6A:
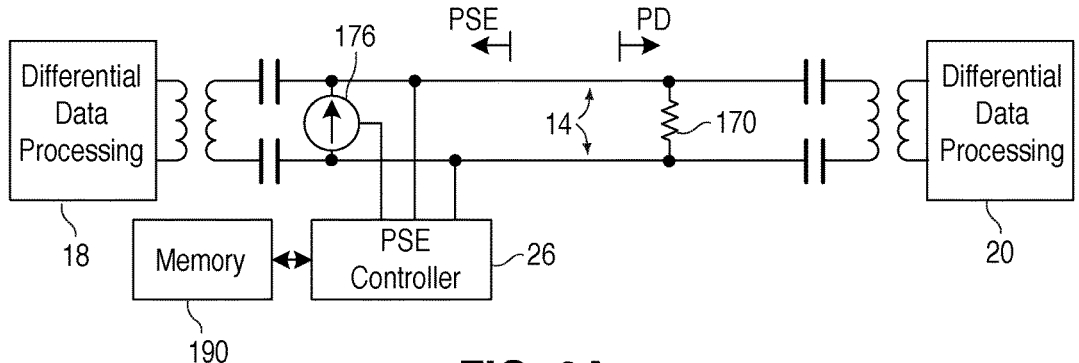
FIG. 6A illustrates how detection/classification information about the PD may be stored in a memory on the PSE side and accessed by the PSE upon powering up to obviated the need for a full handshaking routine to reduce start-up time.
Figure 6B:
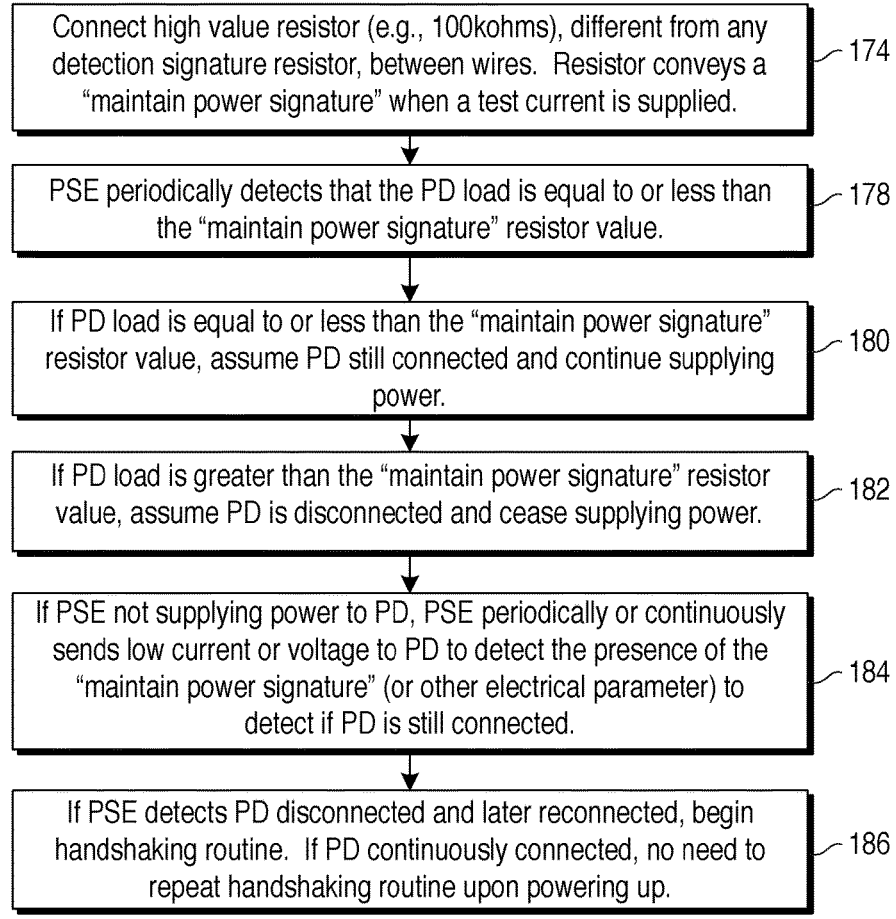
FIG. 6B is a flowchart describing the operation of FIG. 6A relating to the "maintain power signature" resistor.
Figure 6C:
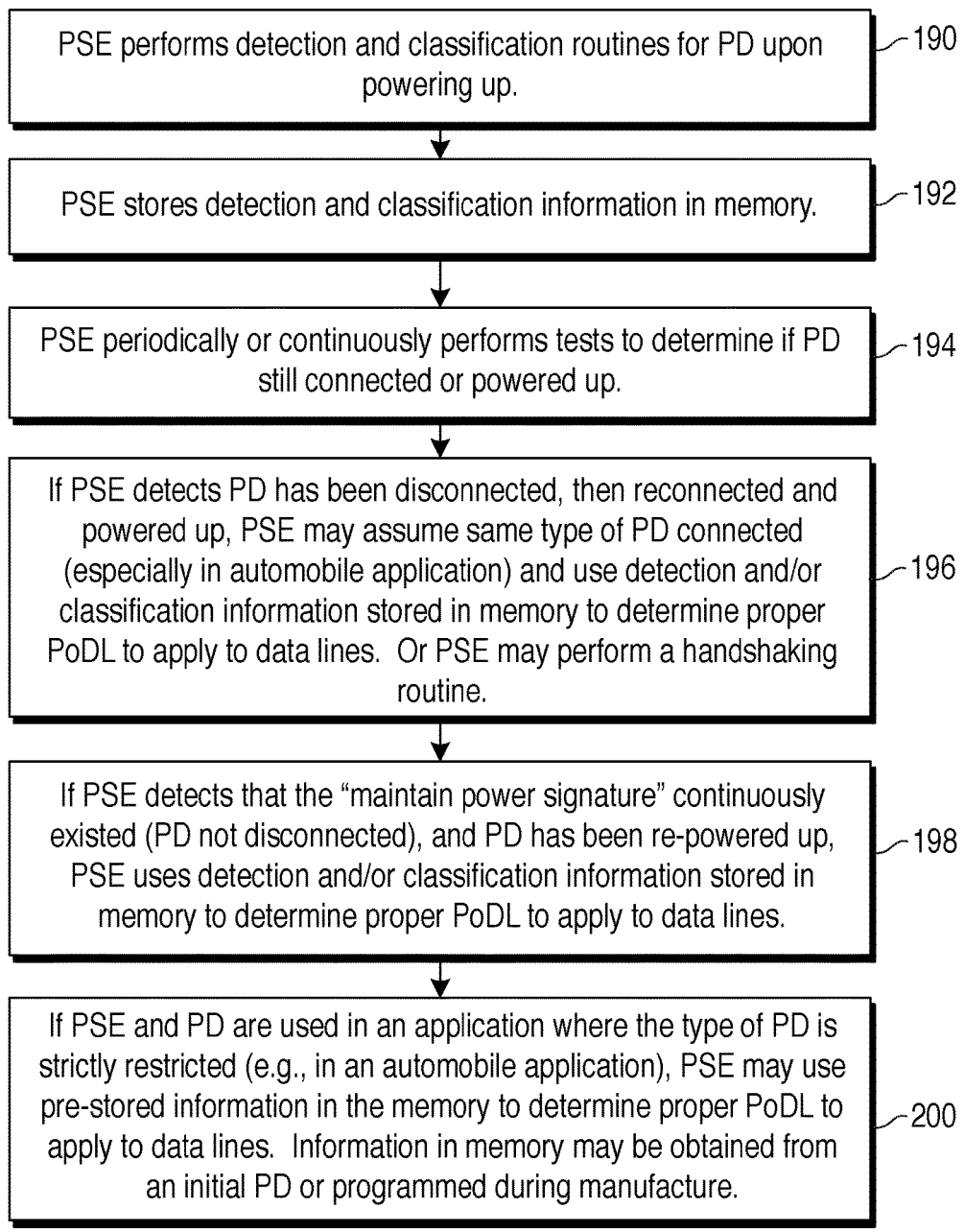
FIG. 6C is a flowchart describing the operation of FIG. 6A relating to storing detection/classification information in the memory.

FIGS. 6A-6C are directed to a technique that allows the PSE to know whether the PD has been disconnected from the wire pair 14 subsequent to a handshaking phase. This enables the PSE to know whether to stop supplying the PoDL and enables the PSE to used stored PoDL information from the PD for a start-up routine rather than performing the full handshaking routine for every powering up event. This saves considerable start-up time.

In FIG. 6A, a high value (e.g., over 100K ohms) resistor 170 is across the wire pair 14 in the PD. This resistance value creates a "maintain power signature" (step 174). The resistance value is much higher than a conventional detection signature resistor of 25K ohms, used during the detection phase, and the resistor 170 remains across the wire pair 14 during normal operation of the PD. Typically, a detection signature resistor, and any other detection signature circuit that draws significant current during normal operation, is switched out of the circuit during normal operation.

In step 174, after the PD has been in normal operation, a low test current is periodically supplied by the current source 176 even when the PD load is not drawing current, such as when it is powered off.

In step 178, the PSE periodically tests that the PD load resistance is equal to or less than the "maintain power signature" resistor value.

In step 180, if the PD load resistance is equal to or less than the "maintain power signature" resistor value, the PSE assumes the PD has not been disconnected subsequent to the last handshaking routine.

In step 182, if the PD load resistance is greater than the "maintain power signature" resistor value, the PSE assumes the PD has been disconnected subsequent to the last handshaking routine. In response, the PSE ceases supplying power to the PD to save energy.

In step 184, when the PSE is not supplying power to the PD during normal operation, the PSE periodically or continuously supplies a low current to the wire pair 14 to detect the "maintain power signature" (i.e., detect whether the PD is just powered off but still connected, or whether the PD has been removed).

In step 186, if the PSE detects that the PD has been disconnected and then connected, the PSE performs the handshaking routine for PoDL. If the PSE detects no disconnection between powering up states of the PD, the PSE does not have to repeat the handshaking routine but may simply supply the full PoDL voltage pursuant to the previous handshaking results.

FIG. 6C shows steps that may be performed using the circuit of FIG. 6A where the previous handshaking results are stored in a non-volatile memory 190 for later use when the PD has been re-powered up.

In step 190, the PSE performs detection and classification routines for the PD upon powering up.

In step 192, the PSE stores the resulting PoDL information in the memory 190. For example, the data stored may be a code corresponding to the operating voltage level, the maximum power of the PD, and other operating characteristics.

In step 194, the PSE periodically performs tests to determine if the PD is still connected or powered up, such as the maintain power signature test described above.

In step 196, if the PSE detects that the PD has been disconnected, then connected and powered up, the PSE may assume that the PD is the same PD or a replacement PD of the same type, which would be true in an automobile application where the automobile manufacturer specifies the PD type. The PSE then accesses the memory 190 for the classification information to supply the proper PoDL voltage. The data stored in the memory 190 may be from an earlier handshaking routine or pre-loaded by the manufacturer. Alternatively, upon the PSE detecting that the PD has been disconnected followed by the detecting of a PD being connected, the PSE may perform the full handshaking routine, rather than use the stored data in the memory 190.

In step 198, if the PSE detects that the maintain power signature has been uninterrupted, even when the PD was powered down, the PSE may use the PoDL data stored in the memory 190 rather than perform the handshaking routine upon powering up.

In another embodiment, the PSE may use the information in the memory 190 and still perform an abbreviated handshaking routine for verifying the PD is PoDL-enabled or for verifying other information.

In step 200, if the application is one that restricts the type of PD used, such as in an automobile, the PoDL information in the memory 190 may be pre-loaded in the memory 190 by the manufacturer, or may be from the first start-up of the system.

Figure 7A:
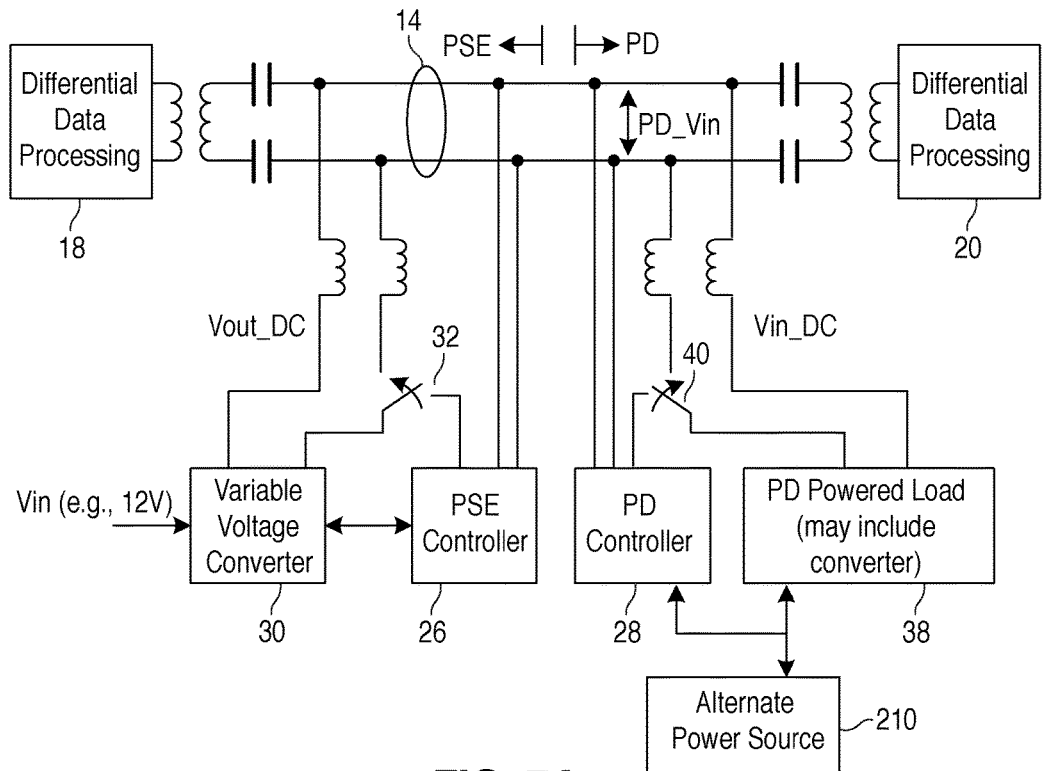
FIG. 7A illustrates the use of an alternate power source in the PD side supplying power to the main PD load, while power to the front end of the PD is supplied by the PSE to enable the PD to still communicate in the event the alternative power source is disabled.
Figure 7B:
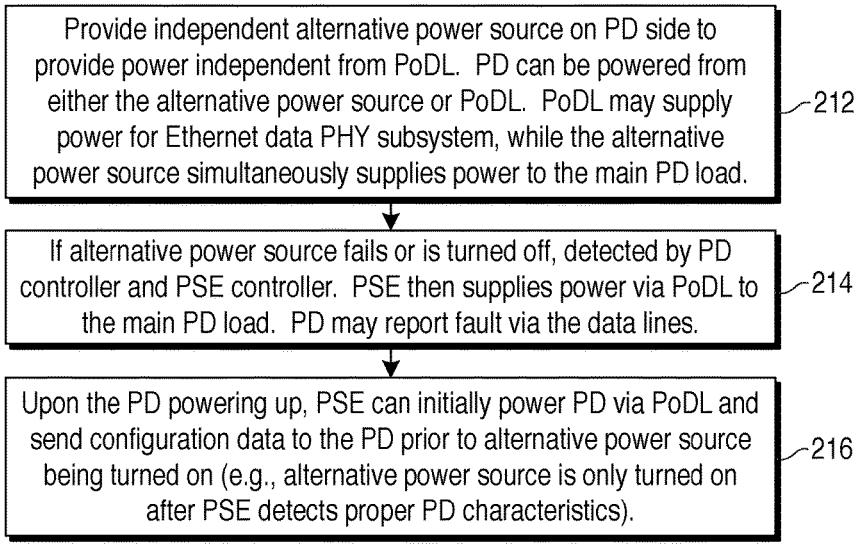
FIG. 7B is a flowchart describing the operation of FIG. 7A.

FIGS. 7A and 7B are directed to a PoDL system where the main PD load is supplied power from an alternate power source 210 located on the PD side, rather than supplied power by the PSE. This situation may occur if the PD load requires more power than can be supplied by the PSE. In such a case, there is some benefit in the PSE still supplying power to the front end of the PD to power the communications channel and certain functions in the PD (other than the main PD load). Using this technique, even if the alternate power source 210 is off or malfunctioning, the PD can still communicate its operational status to the PSE, such as for maintenance. Further, the PD may even allow the PSE to power the PD load in the event of a failure of the alternate power source 210.

FIG. 7A is identical to FIG. 1 except for the addition of the alternate power source 210 coupled to the PD load 38 and the PD controller 28.

In step 212 of FIG. 7B, the alternate power source 201 is provided. The PSE may supply PoDL power for the Ethernet data physical (PHY) subsystem (such as amplifiers, control circuits, etc.) while the alternate power source 210 simultaneously supplies power to the main PD load.

In step 214, if the alternate power source 210 fails or is off, the PD is still able to communicate to the PSE, such as communicate the fault, since the PHY subsystem (and other required circuitry) are powered by PoDL. Additionally, the PD may switch the PoDL power to the PD load 38 for normal or limited operation.

In step 216, upon the PD powering up, the PSE can initially power the PD via PoDL and send configuration data to the PD prior to the alternate power source 210 being turned on. The alternative power source 210 is then properly configured. This is particularly useful if the alternative power source is a general purpose power source and not customized for the particular PD. For example, the PSE may only enable the alternate power source 210 once the PSE detects that the PD is PoDL-enabled and the alternate power source 210 is configured to supply the required voltage.

All the techniques described herein may be combined in various ways as appropriate for a particular application.

Certain ones of the various techniques are particularly suited to automobile applications where the types of PSEs and PDs used are highly regulated, so the handshaking upon each powering up of the PoDL system can be abbreviated or eliminated.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A Power Over Data Lines (PoDL) system comprising:
   Power Source Equipment (PSE) coupled to a Powered Device (PD) via a wire pair, wherein differential data signals and DC power for operating the PD are transmitted over the same wire pair;
   a PSE controller and a PD controller configured to carry out a low power handshaking phase over the wire pair, the handshaking phase providing a first signature signal from the PD to the PSE to identify whether the PD is compatible for receiving an operating voltage over the wire pair or to identify a particular voltage requirement of the PD or to identify a maximum power level of the PD;
   a voltage limiting circuit across the wire pair that limits a voltage across the wire pair to a predetermined magnitude, wherein the voltage of the predetermined magnitude provides the first signature signal;
   a current source in the PSE coupled to the wire pair for conducting a current through the voltage limiting circuit to cause the voltage limiting circuit to generate the first signature signal of the PD; and
   a first detector in the PSE coupled to the wire pair and configured to detect the first signature signal on the wire pair to identify a particular voltage requirement of the PD or to identify a maximum power level of the PD.

2. The system of claim 1 further comprising:
   a processing circuit in the PSE configured to associate the first signature signal with certain PoDL characteristics of the PD; and
   a power source in the PSE controlled by the PSE in response to the first signature signal to supply power to the PD via the wire pair consistent with the first signature signal.

3. The system of claim 1 wherein the current source generates a fixed current, and wherein the voltage limiting circuit is a Zener diode coupled across the wire pair.

4. The system of claim 1 further comprising an Undervoltage Lockout (UVLO) circuit in the PD configured to detect a DC voltage on the wire pair and determine whether the voltage is above a threshold voltage,
   wherein the UVLO circuit is configured to couple the voltage above the threshold level to a PD load after the handshaking phase, and
   wherein the UVLO circuit is configured to prevent coupling the voltage above the threshold level to the PD load if the voltage above the threshold level occurs during the handshaking phase.

5. The system of claim 1 wherein the first signature signal identifies to the PSE controller during the handshaking phase that the PD is compatible for receiving an operating voltage over the wire pair.

6. The system of claim 1 wherein the first signature signal identifies to the PSE controller the maximum power level of the PD.

7. The system of claim 1 wherein the voltage limiting circuit comprises a Zener diode.

8. The system of claim 1 wherein the first detector is configured to digitize the first signature signal to generate a digitized signal and use the digitized signal to look up PoDL characteristics of the PD.

9. A Power Over Data Lines (PoDL) system comprising:
   Power Source Equipment (PSE) coupled to a Powered Device (PD) via a wire pair, wherein differential data signals and DC power are transmitted over the same wire pair;
   a PSE controller and a PD controller configured to carry out a low power handshaking phase over the wire pair, the handshaking phase providing a first signature signal from the PD to the PSE to identify whether the PD is compatible for receiving an operating voltage over the wire pair or to identify a particular voltage requirement of the PD or to identify a maximum power level of the PD;
   a voltage limiting circuit across the wire pair that limits a voltage across the wire pair to a predetermined magnitude, wherein the voltage of the predetermined magnitude provides the first signature signal;
   a current source in the PSE coupled to the wire pair for conducting a current through the voltage limiting circuit to cause the voltage limiting circuit to generate the first signature signal of the PD;
   a first detector in the PSE coupled to the wire pair and configured to detect the first signature signal on the wire pair;
   a processing circuit in the PSE configured to control the current source to apply a first current I1 to the wire pair;
   a first detector in the PSE configured to detect the voltage V1 across the wire pair in response to the first current I1 while the voltage limiting circuit limits the voltage across the wire pair;

the processing circuit in the PSE configured to control the current source to also apply a second current I2 to the wire pair;

the first detector in the PSE configured to detect the voltage V2 across the wire pair in response to the second current I2 while the voltage limiting circuit limits the voltage across the wire pair;

the processing circuit configured to calculate a resistance R of the wire pair using V1, V2, I1, and I2;

the processing circuit configured to calculate voltage drop Vd along the wire pair at any current I by Vd=I*R; and a power source in the PSE controlled by the PSE to supply a voltage on the wire pair for powering the PD, wherein the power source is adjusted to take into account the voltage drop along the wire pair when supplying the voltage on the wire pair.

10. A Power Over Data Lines (PoDL) system comprising:

Power Source Equipment (PSE) coupled to a Powered Device (PD) via a wire pair, wherein differential data signals and DC power are transmitted over the same wire pair;

a PSE controller and a PD controller configured to carry out a low power handshaking phase over the wire pair, the handshaking phase providing a first signature signal from the PD to the PSE to identify whether the PD is compatible for receiving an operating voltage over the wire pair or to identify a particular voltage requirement of the PD or to identify a maximum power level of the PD;

a voltage limiting circuit across the wire pair that limits a voltage across the wire pair to a predetermined magnitude, wherein the voltage of the predetermined magnitude provides the first signature signal;

a current source in the PSE coupled to the wire pair for conducting a current through the voltage limiting circuit to cause the voltage limiting circuit to generate the first signature signal of the PD;

a first detector in the PSE coupled to the wire pair and configured to detect the first signature signal on the wire pair; and a detector circuit in the PD that isolates the PD controller from the voltage limiting circuit during the handshaking phase so the first signature signal is not affected by the PD controller.

11. A Power Over Data Lines (PoDL) system comprising:

Power Source Equipment (PSE) coupled to a Powered Device (PD) via a wire pair, wherein differential data signals and DC power are transmitted over the same wire pair;

a PSE controller and a PD controller configured to carry out a low power handshaking phase over the wire pair, the handshaking phase providing a first signature signal from the PD to the PSE to identify whether the PD is compatible for receiving an operating voltage over the wire pair or to identify a particular voltage requirement of the PD or to identify a maximum power level of the PD;

a voltage limiting circuit across the wire pair that limits a voltage across the wire pair to a predetermined magnitude, wherein the voltage of the predetermined magnitude provides the first signature signal;

a current source in the PSE coupled to the wire pair for conducting a current through the voltage limiting circuit to cause the voltage limiting circuit to generate the first signature signal of the PD; and a first detector in the PSE coupled to the wire pair and configured to detect the first signature signal on the wire pair;

wherein the first signature signal identifies to the PSE controller the particular voltage requirement of the PD.

12. A Power Over Data Lines (PoDL) system comprising:

Power Source Equipment (PSE) coupled to a Powered Device (PD) via a wire pair, wherein differential data signals and DC power are transmitted over the same wire pair;

a PSE controller and a PD controller configured to carry out a low power handshaking phase over the wire pair, the handshaking phase providing a first signature signal from the PD to the PSE to identify whether the PD is compatible for receiving an operating voltage over the wire pair or to identify a particular voltage requirement of the PD or to identify a maximum power level of the PD;

a voltage limiting circuit across the wire pair that limits a voltage across the wire pair to a predetermined magnitude, wherein the voltage of the predetermined magnitude provides the first signature signal;

a current source in the PSE coupled to the wire pair for conducting a current through the voltage limiting circuit to cause the voltage limiting circuit to generate the first signature signal of the PD; and a first detector in the PSE coupled to the wire pair and configured to detect the first signature signal on the wire pair;

wherein the predetermined magnitude of the voltage limited by the voltage limiting circuit is above the operating voltage of the PD.

13. The system of claim 12 wherein the voltage limiting circuit also functions as an electrostatic discharge protection circuit.

* * * * *